United States Patent

Kochsiek et al.

[11] 4,014,439
[45] Mar. 29, 1977

[54] ECCENTRIC POSITIONING DEVICE FOR TOOLS AND WORKPIECES

[75] Inventors: Adolf Kochsiek, Leopoldshohe; Franz Wilhelm, Remscheid-Lennep, both of Germany

[73] Assignee: Wikotool-Systemtechnik Maschinenbau GmbH & Co. KG, Leopoldshohe, Germany

[22] Filed: Jan. 12, 1976

[21] Appl. No.: 648,110

[30] Foreign Application Priority Data

Jan. 10, 1975 Germany .......................... 2500748

[52] U.S. Cl. ................................ 214/1 R; 269/71
[51] Int. Cl.² .................................. B65G 61/00
[58] Field of Search .................... 269/71–73, 269/57; 214/1 R, 1 BD, 1 BB, 1 BT, 1 BV

[56] References Cited

UNITED STATES PATENTS

| 1,414,970 | 5/1922 | Nelson | 269/71 X |
| 3,069,153 | 12/1962 | Brown | 269/73 X |
| 3,926,421 | 12/1975 | Reiger, Jr. et al. | 269/57 |

FOREIGN PATENTS OR APPLICATIONS

| 2,058,448 | 5/1972 | Germany | 269/57 |
| 749,610 | 5/1956 | United Kingdom | 269/71 |

*Primary Examiner*—Frank E. Werner
*Attorney, Agent, or Firm*—Joseph A. Geiger

[57] ABSTRACT

A device for eccentrically moving and positioning a tool, workpiece, or measuring instrument in connection with machining or measuring operations where a large outer drum is rotatably arranged inside a headstock and carries in an eccentrically offset parallel bore a smaller inner drum which, in turn, carries a likewise eccentrically offset parallel spindle sleeve and work spindle which are movable axially in relation to the headstock. Each drum and the work spindle have a drive unit and a clamping device, the drive units of the drum including a main drive and a positioning drive.

9 Claims, 4 Drawing Figures

ECCENTRIC POSITIONING DEVICE FOR TOOLS AND WORKPIECES

BACKGROUND OF THE INVENTION

1. Field of the Invention

The present invention relates to free-cutting machine tools of the boring mill type, and more particularly to an eccentric positioning device for tools, workpieces, and measuring instruments which is also adaptable for rotation of a tool or workpiece around different rotational axes.

2. Description of the Prior Art

The field of free-cutting machine tool technology offers an almost unlimited variety of configurations for the positioning of tools, workpieces, and measuring instruments, in relation to one another and for rotary motion or straight-line motion of either the tool or the workpiece, or both. The type of machine tool which is to be replaced by the device of the present invention commonly uses a moving tool which is carried on a faceplate equipped with a radially adjustable faceplate slide, the radial adjustment being normally performed by hand, using a threaded adjustment spindle. The faceplate itself is carried on the end of a horizontal main spindle which is rotatably supported in a heavy headstock. A workpiece which is to be machined may be mounted directly on the base plate of the machine tool or it may be carried on top of a horizontally adjustable carriage consisting of either a simple longitudinally adjustable table or a cross slide offering two axes of horizontal movement. Depending upon the particular machining operations necessary, additional adjustable supporting means may be provided, in order to obtain angular adjustments of the workpiece in the direction of either roll, pitch, or yaw, for example.

These known machine tools have various shortcomings, most notable among them being a rather high specific load on the bearing surfaces, depending upon the adjustment configuration. These bearing surfaces are also very prone to becoming soiled. The relative positioning between the workpiece and the tool requires separate adjustments on two cross slides and on the faceplate slide along separate straight-line guides which are frequently only moderately rigid. The accuracy of guidance on these straight-line guides is subject to variation, depending upon the amount of load applied against them. Consequently, the machining accuracy of the known machine tools of this type is subject to variations and it is therefore inadequate for a variety of purposes.

SUMMARY OF THE INVENTION

Underlying the present invention is the primary objective of devising an improved machine tool of the above-mentioned type, and especially of suggesting a novel device for the positioning of a cutting tool, or workpiece, and/or a measuring instrument, where the earlier-mentioned shortcomings of the prior art devices are overcome. The suggested novel device is to permit repeatable positioning operations of highest accuracy, involving simple maneuvers, while supporting the weight of the tool, workpiece, or measuring instrument in a rigid bearing configuration whose specific bearing loads remain low and substantially unchanged, even under extreme machining conditions.

The present invention proposes to attain these objectives by suggesting a novel positioning device using a headstock accommodating therein a rotatably supported outer drum inside of which is rotatably supported, at an eccentric offset, an inner drum, which in turn supports, again eccentrically offset, an axially movable spindle sleeve carrying a work spindle, and, on one axial end thereof, the tool, workpiece, and/or measuring instrument.

The device of the invention affords various advantages, among them the possibility of positioning the cutting tool, workpiece, and/or measuring instrument through rotational displacements of the outer drum in relation to the headstock and of the inner drum in relation to the outer drum, respectively, whereby the spindle sleeve can be moved to any point within a given circular area. This area is defined by a radius from the center of the outer drum which is equal to the maximum distance of the spindle sleeve axis from the outer drum axis, provided the eccentricity of the inner drum in relation to the outer drum is equal to, or smaller than the eccentricity of the spindle sleeve in relation to the inner drum. The two eccentricities are preferably identical, in which case the positioning range is a circle with a radius equal to twice said eccentricity.

The novel device thus uses as supporting engagements only engagements of the rotational type, viz, bearings, which are known for their superiority over slides in terms of precision and rigidity of guidance. Furthermore, the type of bearings suggested use very large diameters, so that the specific loads which are to be carried on the surfaces of bearing contact are very low and remain substantially unaffected by the particular adjustment position of the cutting tool, workpiece, or measuring instrument. Accordingly, the proposed novel device is entirely free of bending moments on the bearing surfaces that provide the adjustability.

A still further advantage of the present invention relates to the great ease with which the penetration of soil and foreign matter into the bearing surfaces can be prevented. Another advantage relates to the fact that the device is insensitive to temperature changes, because all the constituent elements of the device are subject to the same temperature conditions, so that they undergo identical temperature-related expansions and contractions. The result is a positioning device for cutting tools, workpieces, and/or measuring instruments of highest adjustment accuracy and repeating consistency, an exceptionally rigid supporting configuration being maintained in all adjustment positions of the machining or measuring operation, while the adjustment surfaces are virtually free of wear, because they are protected against the penetration of soil and abrasive agents.

The positioning device of the present invention is very versatile, in that it lends itself to efficient use in a large variety of machining and measuring applications, without the need for modification of the device. Thus, it is possible for the work spindle to carry a cutting tool, intended for the machining of a stationary workpiece which is mounted on the base plate adjacent to the headstock. Machining motions can be produced in various different ways, first by rotating the outer drum while clamping the inner drum relative to the outer drum and by also clamping the work spindle in relation to the inner drum. This movement mode is particularly suited for the machining of bores of very large diameter.

Alternatively, it is possible to clamp the outer drum in relation to the headstock and to rotate the inner drum, while maintaining the work spindle non-rotatable in relation to the inner drum. It is further possible to clamp both the outer drum and the inner drum and to rotate the work spindle inside the spindle sleeve with a boring tool attached to its extremity. Lastly, it is further possible to clamp both drums and to maintain the spindle non-rotatable, while advancing the spindle sleeve in the axial direction in a linear motion, for reaming, slotting, and other straight-line machining operations.

Obviously, the movement possibilities which have been enumerated above in connection with a cutting tool, are also available for any workpiece or measuring instrument that may be attached to the work spindle or to the spindle sleeve. Advantageously, a suitable measuring instrument may be interchangeably attached to the work spindle immediately after termination of a machining pass, in order to measure the results thereof.

The preferred embodiment of the invention suggests a rotatable work spindle arranged inside the axially movable spindle sleeve which is supported by the inner drum of the device. This arrangement has the advantage, that cutting tools or workpieces are rotatable about the axis of the spindle sleeve, while the latter itself may be non-rotatably supported for only axial displacements. This arrangement has the advantage that the supporting surfaces of the spindle sleeve can be designed specifically for reciprocating movements, while the spindle, in turn, may be designed exclusively for rotary motion inside the axially movable spindle sleeve. The result is a considerable simplification of the component parts which provide the support for the spindle sleeve inside the inner drum and the support for the work spindle inside the spindle sleeve.

In order to obtain accurate repeat-positioning of the device, it is further suggested to arrange graduated rings on the outer drum and on the inner drum for the indication of the exact angular drum positions on suitable reading units. These reading units may also be designed to incorporate controls for an automatic positioning of the respective drums, using electronic signals for the determination of the angular position and for the starting and stopping actions of the positioning drives of the device. The axially adjustable spindle sleeve is likewise equipped with a position indicating means in the form of a rearwardly extending graduated rod and a cooperating reading unit, for the automatic control of the axial position of the cutting tool, workpiece or measuring instrument whose axial displacement is obtained by means of a hydraulic cylinder surrounding the spindle sleeve.

In the preferred embodiment of the invention, the graduated rings are collar-like flanges attached to one extremity of the inner and outer drums, having a maximum diameter which is larger than the diameter of the associated drum. This arrangement produces the largest possible measuring displacements at the reading units, for a maximum reading ease, the reading errors being reduced to a minimum, since the graduation markings are magnified in relation to the actual displacement of the cutting tool, workpiece, or measuring instrument which is attached to the work spindle. Obviously, this ratio of magnification increases, as the radial distance between the work spindle axis and the axis of the outer drum decreases. By taking advantage of this fact, it is possible to position the cooperating workpiece, or cutting tool, respectively, in such a way that primarily the mid-area of the outer drum is used, in order to obtain highest positioning accuracy and repeat-positioning consistency. Because the adjustment system of the invention is essentially rigid in all adjustment positions, regardless of the weight and position of the cutting tool, workpiece, or measuring instrument carried by it, it is even possible to take corrective measures for any built-in adjustment errors of the device.

In the preferred embodiment of the invention, each adjustment drum has a dual drive consisting of a main drive and a positioning drive, the dual drive being arranged to cooperate with a clamping device. This combination makes possible the selective rotation, angular positioning, and/or clamping of the outer drum in relation to the headstock and of the inner drum in relation to the outer drum. A separate drive for the work spindle also permits selective rotation or rotational positioning of the latter. In each case, the main drive is preferably a powerful drive capable of continuously rotating the particular drum, while the positioning drive requires much less energy, but is capable of moving the associated drum to a precise angular position, using a two-speed positioning motion with an approach speed and a fine-adjustment speed, if necessary.

The clamping devices of the preferred embodiment of the invention feature oppositely positioned brake shoes carried by one of two cooperating members, which are the headstock and outer drum in one case, and the outer drum and the inner drum in the other case, the brake shoes engaging oppositely facing planar surfaces on the other of the two cooperating members, which is preferably in both cases the outer drum. The clamping devices are so arranged that their action in no way affects the relative positions of the headstock and of the two drums when a clamping action is initiated.

BRIEF DESCRIPTION OF THE DRAWINGS

Further special features and advantages of the invention will become apparent from the description following below, when taken together with the accompanying drawings which illustrate, by way of example, an embodiment of the invention, represented in the various figures as follows.

DESCRIPTION OF THE PREFERRED EMBODIMENT

Figure 1:
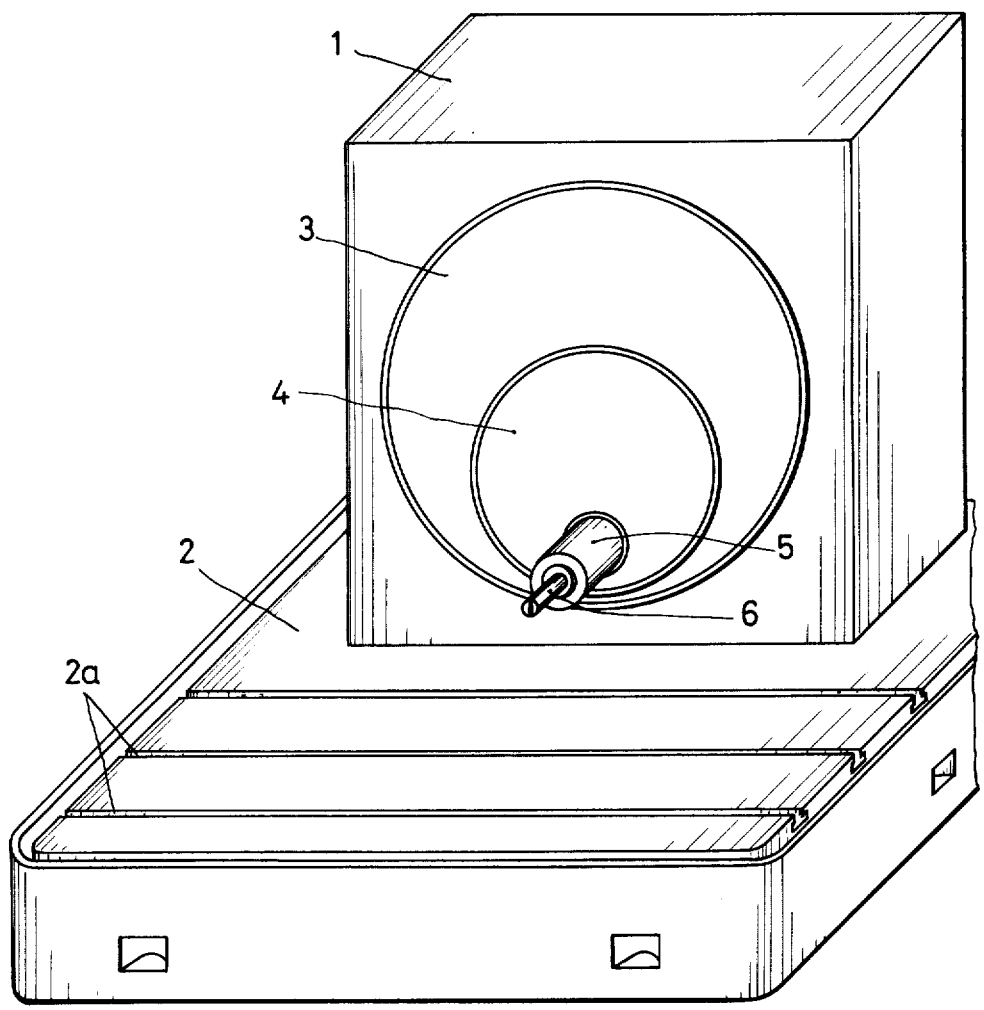
FIG. 1 shows the device of the invention in a somewhat schematic perspective view.
Figure 3:
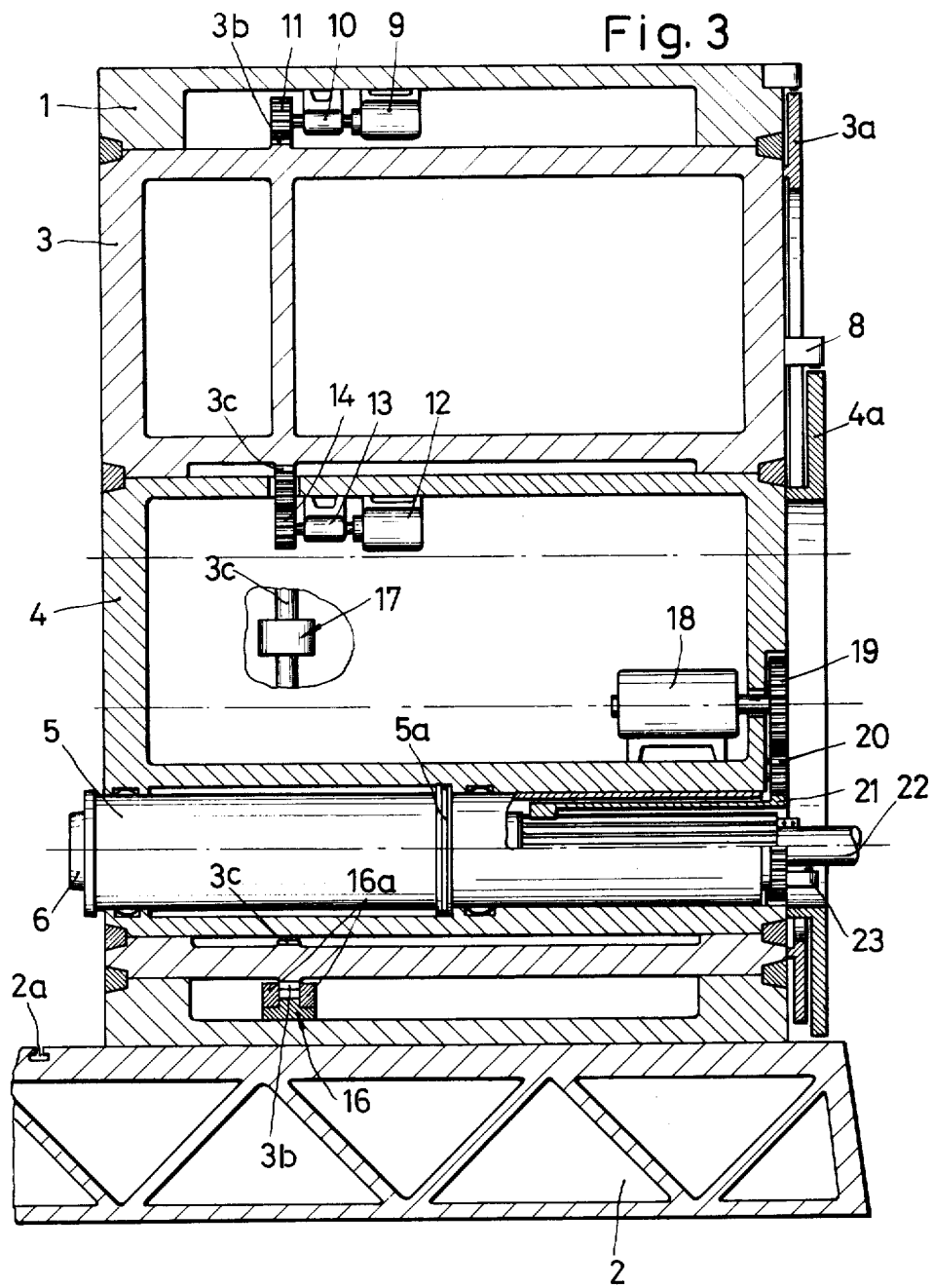
FIG. 3 shows the device of FIG. 1 in an elevational, longitudinally cross-sectioned representation.

Referring to FIGS. 1 and 3 of the drawing, there can be seen a positioning device for tools, workpieces, and measuring instruments consisting of a headstock 1 which, in the embodiment illustrated, is seen to be mounted on a base plate 2. The latter has a flat horizontal mounting surface with T-shaped mounting grooves 2a arranged in parallel alignment with the front face of the headstock 1. Workpieces or cutting tool holders, or a removable cross slide may be mounted on the surface of the base plate 2.

The headstock 1 is essentially a hollow housing with a single large, horizontally oriented bore accommodating therein an outer drum 3 in a rotational engagement with the headstock 1. The outer drum 3 itself has a large, likewise horizontally oriented, but eccentrically offset bore inside which is rotatably arranged an inner drum 4. The inner drum 4, in turn, holds a likewise horizontally oriented, and again eccentrically offset spindle sleeve 5 inside a spindle sleeve bore. While the outer drum 3 is rotatable relative to the headstock 1, and the inner drum 4 is rotatable relative to the supporting outer drum 3, the spindle sleeve 5 is axially movable in relation to the inner drum 4. Lastly, the hollow spindle sleeve 5 carries a work spindle 6 which is rotatably arranged inside the spindle sleeve 5.

Rotational adjustments of the outer drum 3 in relation to the headstock 1 and of the inner drum 4 in relation to the outer drum 3 make it possible to position the work axis, i.e., the axis of the spindle sleeve 5 and work spindle 6 at any point within a circular area whose radius from the rotational axis of the outer drum 3 equals the maximum distance of the work axis from the outer drum axis, provided the eccentricity of the inner drum 4 in relation to the outer drum 3 is not larger than the eccentricity of the spindle sleeve 5 in relation to the inner drum 4. The two eccentricities are preferably identical in size, so that the radius of the circular area within which the work axis is adjustable equals twice said eccentricity. The adjustment position of the work spindle 6 is thus in all cases equal to the geometric sum of the two eccentricities, as expressed by the trigonometric conversion of the angular positions of the two adjustment drums into horizontal and vertical coordinate values.

Figure 2:
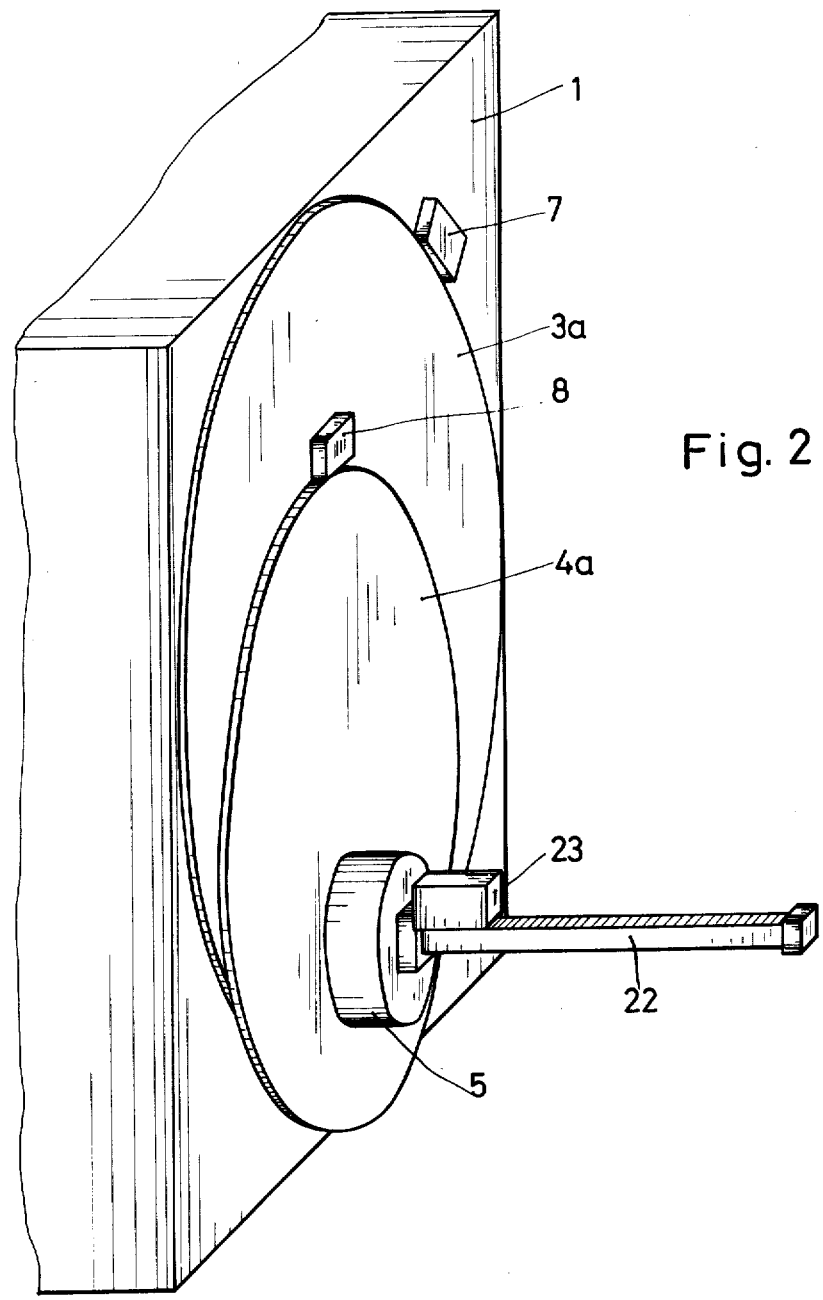
FIG. 2 shows the rear side of the device of FIG. 1 in a likewise schematic, perspective view.

In order to precisely adjust and verify the particular angular positions of the two adjustment drums, the latter have attached to them suitable graduated rings, as can be seen in FIG. 2 and FIG. 3. Accordingly, the outer drum 3 carries on its rear extremity an outer graduated ring 3a, and the inner drum 4 carries on its rear extremity a similar inner graduated ring 4a. The two graduated rings 3a and 4a cooperate with stationary reading units 7 and 8, respectively, of which the reading unit 7 is mounted on the headstock 1, while the reading unit 8 is mounted on the rear face of the outer drum 3.

As shown in FIG. 3, the movement of the outer drum 3 with respect to the supporting headstock 1 is obtained by means of a drive group consisting of a main drive 1 and a coaxially connected positioning drive 10 with a drive pinion 11 engaging an external gear teeth profile 3b on the periphery of the outer drum 3. The inner drum 4 carries a similar rotational drive group consisting of a main drive 12 and a coaxial positioning drive 13 which are mounted on the inside of the inner drum 4. A drive pinion 14 and an intermediate pinion 15 transmit the drive torque to an internal gear teeth profile 3c on the outer drum 3. While the main drives 9 and 12 serve to impart to their respective drums a continuous rotary machining motion, the positioning drive 10 and 13, respectively, serve to move the outer drum 3 or the inner drum 4 to a particular angular position. The two drums can be blocked against rotation by clamping them in any angular position, a clamping device 16 being arranged to hold a given angular setting of the outer drum 3 in relation to the headstock 1, and a similar clamping device 17 on the inner drum 4 being arranged to hold any angular setting of the inner drum 4 in relation to the outer drum 3.

Figure 4:
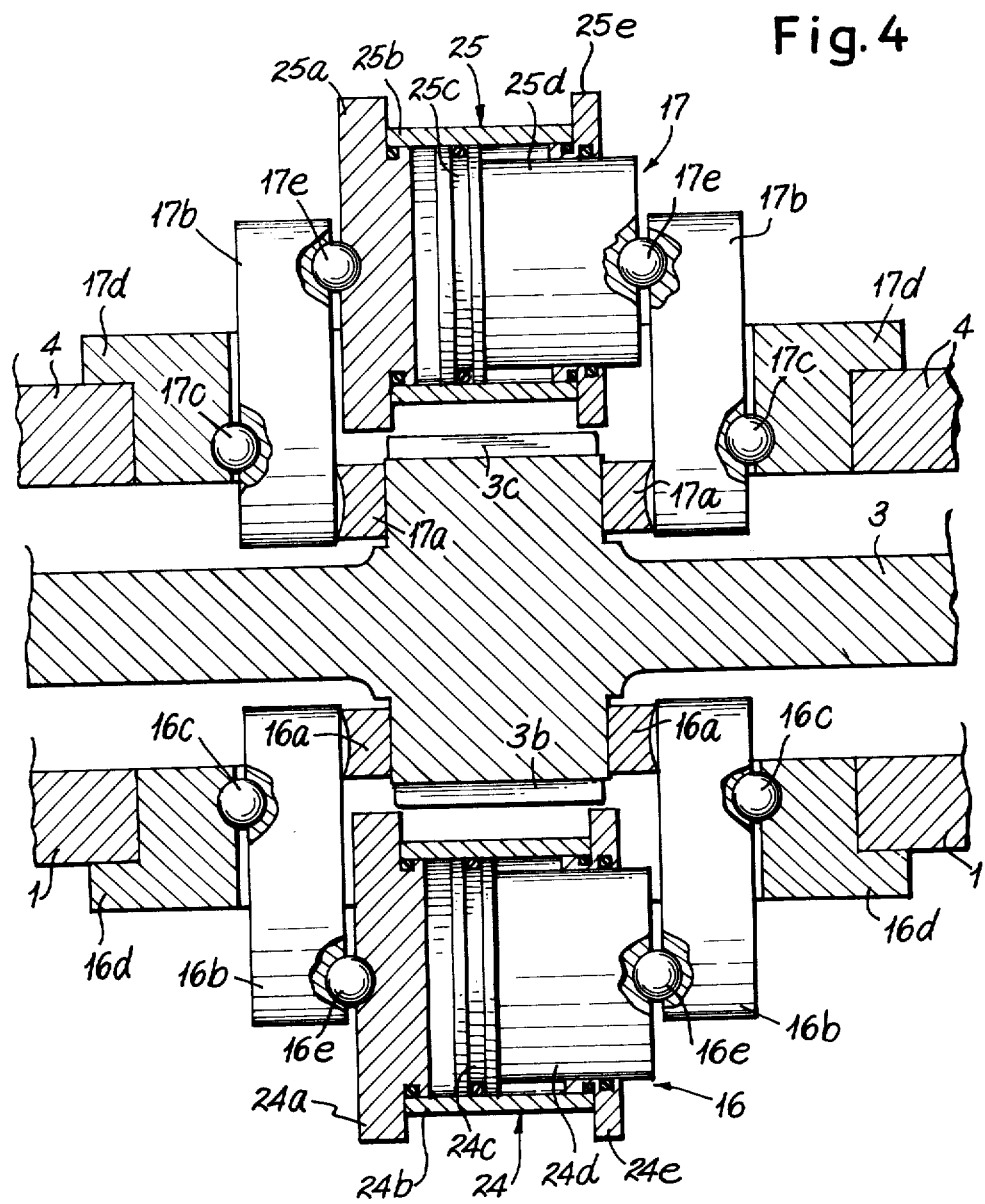
FIG. 4 shows two clamping devices as part of the positioning device of the invention.

The clamping devices 16 and 17 are illustrated in more detail in FIG. 4, where they engage the external gear teeth profile 3b and the internal gear teeth profile 3c of the outer drum on opposite sides of the latter. These gear teeth profiles are provided with parallel planar flanks which are engaged by the stationary clamping device 16 of the headstock 1, on the one hand, and by the rotating clamping device 17 of the inner drum 4, on the other hand. The detailed construction of these clamping devices will be explained in more detail further below.

On the inside of the inner drum 4 is further arranged a work spindle drive, its drive motor 18 carrying a drive pinion 19 which, via an intermediate gear 20, engages a rotatable drive sleeve 21 surrounding the work spindle 6. A spline connection transmits the torque from the axially confined drive sleeve 21 to the axially movable work spindle 6. The axial position of the work spindle 6 is determined by the spindle sleeve 5 whose axial mobility is the result of a hydraulic cylinder arrangement of which a collar-like protrusion on the spindle sleeve 5 forms a piston 5a. The axial position of the spindle sleeve 5 and work spindle 6 is reflected on a rearwardly extending graduated rod 22 which cooperates with a suitable reading unit 23.

Referring to FIG. 4, it can be seen that the two clamping units 16 and 17 for the outer drum 3 and for the inner drum 4, respectively, are essentially identical in structure and operation. For the sake of simplicity of representation, the two clamping devices 16 and 17 are shown in angular alignment with each other, at a place on the outer drum 3 where the external and internal gear teeth profiles 3b and 3c are on opposite sides of the thinnest portion of the drum wall.

The stationary clamping device 16, being mounted in the lower portion of the headstock 1, consists essentially of a pair of clamping shoes 16a engaging oppositely facing planar flanks of the external gear teeth profile 3b of the outer drum 3. Each clamping shoe 16a is attached to a pivotable clamping lever 16b which defines a first pivot connection 16c with a stationary supporting member 16d, mounted on the headstock 1, and a second pivot connection 16e with one extremity of a hydraulic cylinder assembly 24. The latter consists of a closed axial flange 24a, a tubular cylinder casing 24b, and a piston 24c, of which the piston rod 24d extends axially through a bore in the open flange 24e of the assembly. The second pivot connections for the two clamping levers 16b thus engage the closed flange 24a and the protruding extremity of the piston rod 24d, respectively. This clamping configuration produces a balanced clamping force on the two clamping shoes 16a, when the cylinder space between the closed flange 24a and the piston 24c is pressurzied. It follows that the clamping action against the external gear teeth profile 3b by the clamping device 16 exerts no rotational force whatsoever on the outer drum 3, except to prevent any further angular movement of the latter in relation to the headstock 1. A reverse pressurization of the hydraulic cylinder assembly 24 between its piston 24a and the open flange 24b causes the clamping levers 16b to relax and to open the clamping engagement between the clamping shoes 16a and the external gear teeth profile 3b.

A similar clamping device 17 is mounted on the inside of the inner drum 4, extending outwardly therefrom into engagement with the internal gear teeth profile 3c of the outer drum 3. The two clamping shoes 17a are again attached to two clamping levers 17b which are pivotably connected to a supporting member 17d by means of a first pivot connection 17c, and which engage the hydraulic cylinder assembly 25 by means of a second pivot connection 17e. The hydraulic cylinder assembly 24 features the same components and operation as the earlier described hydraulic cylinder assembly 24, consisting of a closed flange 25a, a cylinder casing 25b, a piston 25c with a piston rod 25d, and an open flange 25e.

The cutting tool, workpiece, or measuring apparatus which is to be positioned by means of the device of the present invention is normally attached to the forward extremity of the work spindle 6, but has been omitted from the drawing. The operation of the device depends upon its intended use, the main drives 9 and 12, and the associated positioning drives 10 and 13, in combination with the clamping devices 16 and 17, offering a wide variety of cutting movements and positioning maneuvers on the outer drum 3, and/or the inner drum 4 and/or the spindle sleeve 5 and its rotatable spindle 6. If, on the other hand, the work spindle 6 is held fast against rotation, it may be rotated about the axis of the outer drum 3, by driving the latter in a continuous rotating motion, or it may be rotated about the axis of the inner drum 4, by holding the outer drum 3 stationary and driving the inner drum 4 for continuous rotation. The spindle sleeve 5 provides a simultaneous axial mobility. Alternatively, both drums can be held stationary by actuating the clamping devices 16 and 17, while the work spindle 6 receives a rotating motion from its drive 18. Lastly, it is also possible to block in position not only the two drums 3 and 4, but also the work spindle 6, in which case the cutting tool, workpiece, or measuring instrument which is attached to the front end of the work spindle 6 can execute a reciprocating straight-line motion in the axial sense.

The device of the present invention also lends itself for the generation of straight-line motions of the spindle sleeve 5 and work spindle 6 in the planar sense, i.e., pendendicularly to the work spindle axis, in any direction, including the vertical and horizontal directions. Such a straight-line motion is obtained when both the outer drum 3 and the inner drum 4 are rotated simultaneously, but in the opposite sense and the angular speed of the inner drum 4 in relation to the outer drum 3 is twice the angular speed of the outer drum 3 in relation to the headstock 1.

It should be understood, of course, that the foregoing disclosure describes only a preferred embodiment of the invention and that it is intended to cover all changes and modifications of this example of the invention which fall within the scope of the appended claims.

We claim the following:

1. A device for eccentrically moving and positioning a tool, or a workpiece, or a measuring instrument in connection with machining or measuring operations, for example, the device comprising in combination:
   a stationary headstock, serving as a housing for the device;
   an outer drum received inside a large bore in the headstock, in a rotatable bearing relationship therewith;
   a smaller inner drum received inside a matching bore in the outer drum, in a rotatable bearing relationship therewith, the rotational axes of the outer and inner drum being arranged in parallel alignment, but eccentrically offset from one another by a first eccentricity;
   a carrier member for said tool, workpiece, or measuring instrument received inside a matching bore in the inner drum in an axially movable relationship therewith, the rotational axis of the inner drum and the longitudinal axis of the carrier member being likewise arranged in parallel alignment, but eccentrically offset from one another by a second eccentricity;
   means for rotating the outer drum in relation to the headstock;
   means for rotating the inner drum in relation to the outer drum, so that the carrier member axis can be moved to any position within an annular positioning range whose small radius equals the difference between the two eccentricities and whose large radius equals their sum; and
   means for axially moving the carrier member.

2. An eccentric moving and positioning device as defined in claim 1, wherein
   the first and second eccentricities are equal in size; and
   the positioning range for the carrier member is, accordingly, a circle of a radius equal to twice said eccentricity.

3. An eccentric moving and positioning device as defined in claim 1, further comprising:
   a work spindle arranged for rotation inside the carrier member, the latter being a spindle sleeve surrounding and supporting the work spindle so as to move axially with the spindle sleeve; and
   means for driving the work spindle independently of its axial position in relation to the headstock.

4. An eccentric moving and positioning device as defined in claim 1, further comprising
   means for reading the angular position of the outer drum in relation to the headstock;
   means for reading the angular position of the inner drum in relation to the outer drum; and
   means for reading the axial position of the carrier member in relation to the headstock.

5. An eccentric moving and positioning device as defined in claim 4, wherein
   the outer drum position reading means includes a graduated ring on the periphery of the outer drum and a cooperating reading unit mounted on the stationary headstock; and
   the inner drum position reading means includes a similar graduated ring on the periphery of the inner drum and a cooperating reading unit mounted on the outer drum.

6. An eccentric moving and positioning device as defined in claim 4, wherein
   the carrier member position reading means includes a graduated member extending axially from the carrier member and a cooperating reading unit mounted on the inner drum.

7. An eccentric moving and positioning device as defined in claim 1, wherein
   the outer drum rotating means includes a main drive for a continuous rotation of the drum, and a positioning drive for the angular positioning of the outer drum in relation to the headstock, including means for holding the outer drum in any angular position; and
   the inner drum rotating means includes a main drive for a continuous rotation of the drum, and a positioning drive for the angular positioning of the inner drum in relation to the outer drum, including means for holding the inner drum in any angular position relative to the outer drum.

8. An eccentric moving and postioning device as defined in claim 7, wherein the position holding means of the outer drum and of the inner drum are similar in structure and operation, each including a clamping device having axially movable clamping shoes on one member cooperating with oppositely facing planar flanks on the other member.

9. An eccentric moving and positioning device as defined in claim 8, wherein the main drive and positioning drive of the outer drum rotating means is mounted in the headstock, said means including a pinion engaging an exterior gear teeth profile on the periphery of the outer drum;

the main drive and positioning drive of the inner drum rotating means is mounted in the inner drum, said means including a pinion engaging an interior gear teeth profile on the outer drum; and the clamping devices of the two drum position holding means are likewise mounted in the headstock and in the inner drum, respectively, their clamping shoes engaging the axial flanks of the exterior and interior gear teeth profiles, respectively.

* * * * *